US010533134B2

(12) United States Patent
Nansen et al.

(10) Patent No.: US 10,533,134 B2
(45) Date of Patent: Jan. 14, 2020

(54) METHODS AND APPARATUSES FOR SELECTIVE CHEMICAL ETCHING

(71) Applicant: THE BOEING COMPANY, Chicago, IL (US)

(72) Inventors: David S. Nansen, Renton, WA (US); Walter A. Beauchamp, Sammamish, WA (US); Lee C. Firth, Renton, WA (US)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 15/448,794

(22) Filed: Mar. 3, 2017

(65) Prior Publication Data
US 2017/0174987 A1 Jun. 22, 2017

Related U.S. Application Data

(62) Division of application No. 14/712,208, filed on May 14, 2015, now Pat. No. 9,624,430.

(51) Int. Cl.
C09K 13/00 (2006.01)
C23F 1/02 (2006.01)
C23F 1/04 (2006.01)
C23F 1/08 (2006.01)
B05C 5/00 (2006.01)

(52) U.S. Cl.
CPC ............... C09K 13/00 (2013.01); B05C 5/00 (2013.01); C23F 1/02 (2013.01); C23F 1/04 (2013.01); C23F 1/08 (2013.01)

(58) Field of Classification Search
None
See application file for complete search history.

(56) References Cited

U.S. PATENT DOCUMENTS

| 5,096,536 | A | * | 3/1992 | Cathey, Jr. ........ H01J 37/32431 118/724 |
| 5,271,798 | A | | 12/1993 | Sandhu et al. |
| 6,494,219 | B1 | | 12/2002 | Nayak et al. |
| 8,822,346 | B1 | | 9/2014 | Weiner |
| 2002/0046707 | A1 | * | 4/2002 | Biberger ........... H01L 21/67051 118/733 |
| 2005/0247673 | A1 | | 11/2005 | Delamarche et al. |
| 2006/0065622 | A1 | | 3/2006 | Floyd et al. |
| 2007/0256710 | A1 | * | 11/2007 | Wen ................ H01L 21/67086 134/22.1 |

(Continued)

FOREIGN PATENT DOCUMENTS

| EP | 2511398 A1 | 10/2012 |
| GB | 2438385 A | 11/2007 |
| JP | H04301088 A | 10/1992 |

OTHER PUBLICATIONS

Webpage Surface Finishing Tutorial from http://www.misumi-techcentral.com/tt/en/surface/2009/12/030-chemical-millint.html dated May 12, 2015 May 12, 2015.

(Continued)

*Primary Examiner* — Sylvia MacArthur
(74) *Attorney, Agent, or Firm* — Coats & Bennett, PLLC

(57) ABSTRACT

Methods, apparatuses and systems are disclosed for chemically etching parts by generating an enclosed chemical etching chamber in contact with a part surface and directing a flow of chemical etchant solution in contact with a part region to be etched.

11 Claims, 6 Drawing Sheets

(56) References Cited

U.S. PATENT DOCUMENTS

| | | | |
|---|---|---|---|
| 2008/0149594 A1 | 6/2008 | Yen et al. | |
| 2012/0241008 A1 | 9/2012 | Mills et al. | |
| 2013/0026690 A1* | 1/2013 | Nishimoto | B65G 49/063 269/21 |
| 2013/0171833 A1* | 7/2013 | Buckalew | C25D 5/00 438/758 |
| 2015/0325460 A1* | 11/2015 | Furusawa | H01L 21/30604 438/745 |
| 2016/0333269 A1* | 11/2016 | Nansen | C23F 1/02 |
| 2017/0174987 A1* | 6/2017 | Nansen | C23F 1/02 |

OTHER PUBLICATIONS

DR. S. Hazem, webpage Nontraditional Chemical Processes from http://osp.mans.edu.eg/s-hazem/NTM/NTCM.html dated May 12, 2015 May 12, 2015.

* cited by examiner

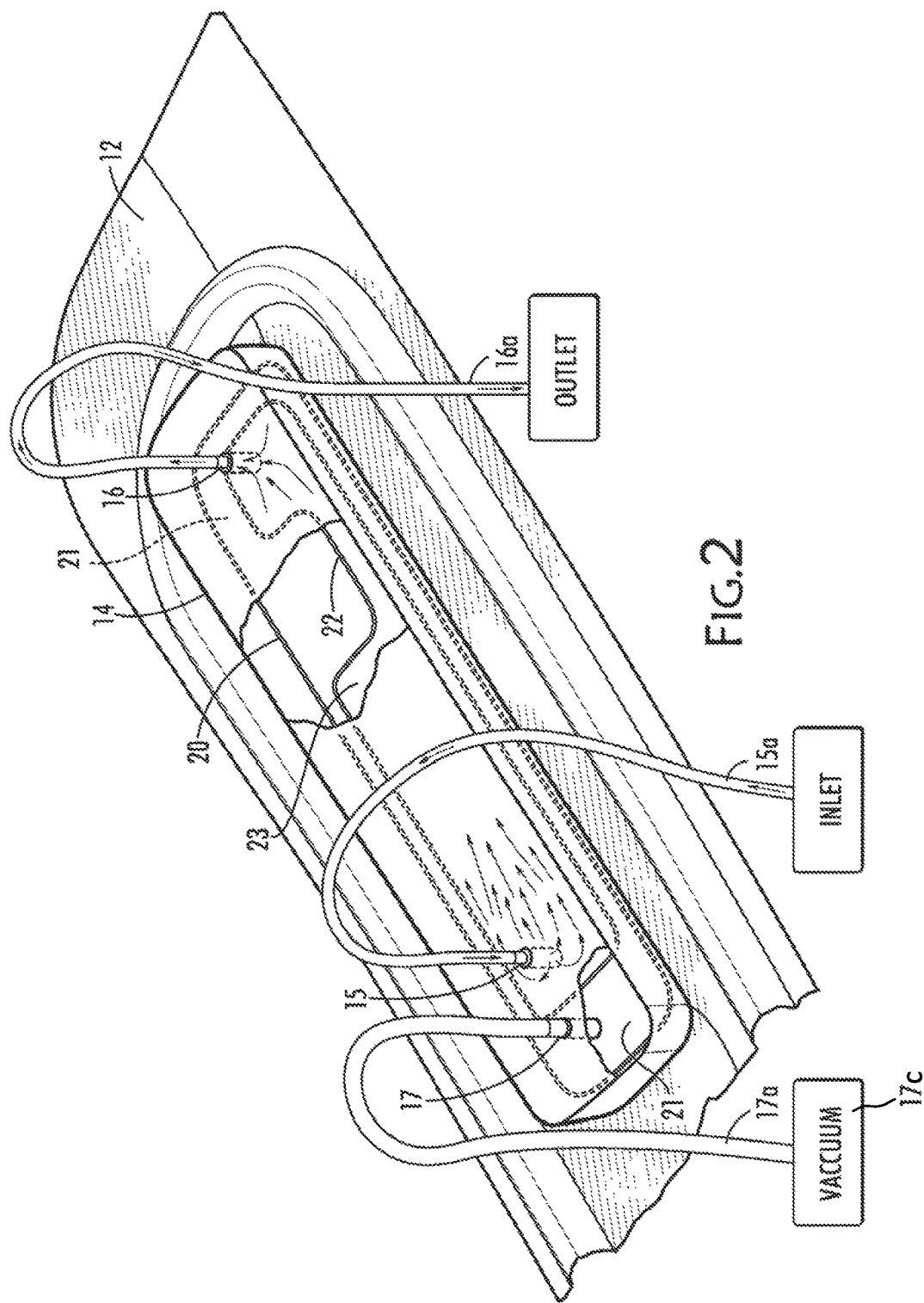

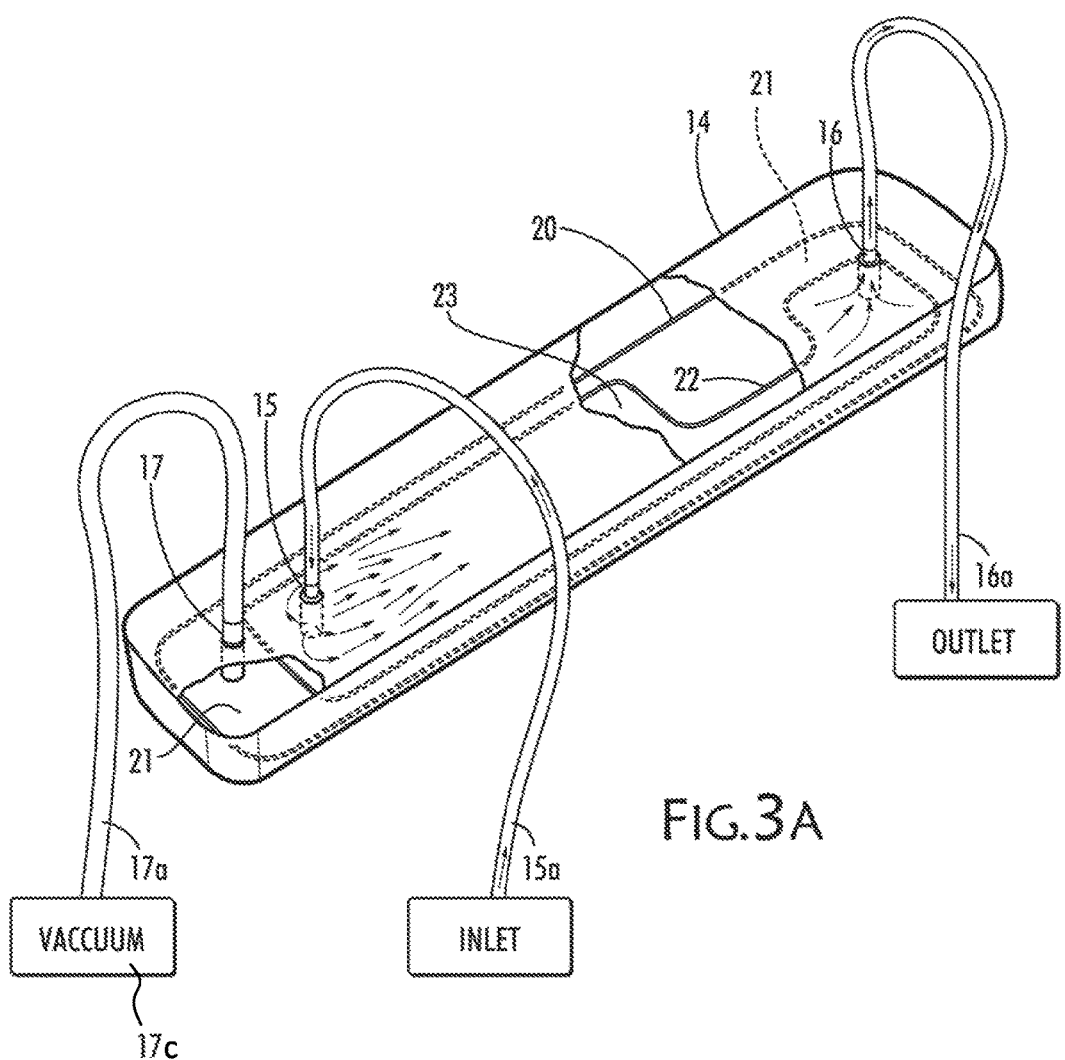

METHODS AND APPARATUSES FOR SELECTIVE CHEMICAL ETCHING

This application is a divisional of U.S. patent application Ser. No. 14/712,208, filed 14 May 2015, now U.S. Pat. No. 9,624,430, issued Apr. 18, 2017, the disclosure of which is incorporated by reference herein in its entirety.

TECHNOLOGICAL FIELD

The present disclosure relates generally to apparatuses, methods and systems for chemical etching. More specifically, the present disclosure relates to apparatuses, methods and systems for enclosed precision chemical etching of parts.

BACKGROUND

Chemical milling or chemical etching refers to the process of removing undesired material from a part, or otherwise exposing a surface of a part. Chemical etching typically occurs as a precursor process to further processing of a part. In typical chemical etching processes, a part has a portion of its surface masked from unwanted surface material removal that occurs during the chemical etching. The masked area of the part represents the portion of the part surface that will remain unchanged from the chemical etching process. The unmasked areas on the part, therefore, will be exposed and subject to the effects of the chemical etching process. For the purposes of the present disclosure, the terms "chemical milling" and "chemical etching"; and "milling" and "etching" are understood to be equivalent terms.

Typical chemical etching procedures require the presence of a chemical bath into which a part is placed or immersed. The chemical bath comprises chemicals used to "etch" or change the exposed part surface, usually through material removal from the exposed surfaces. The etching chemicals are typically hazardous to use and dispose of. Typical chemical etching baths comprise etching chemicals such as, for example, nitric acid, hydrochloric acid, hydrofluoric acid, etc. Industrial sized chemical etching baths can range in volume from about several hundred gallons up to several thousand gallons. Known chemical etching processes employing a large volume chemical etching bath therefore create a significant and expensive waste disposal issue when the baths become depleted and otherwise require replacement.

In addition, known chemical etching methods become undesirable if the part to be etched is a "high risk" part, where any accidental and unwanted exposure of a part surface to a chemical bath can result in part damage and lead to significant material waste due to part rejection. This is of particular, though not exclusive, concern with parts comprising precision milled holes and pathways, etc.

A chemical etching process that eliminates the risk of unwanted chemical etching on particular part surfaces, while also reducing part waste and also reduces the attendant costs for part waste and chemical bath maintenance and disposal would be highly advantageous.

BRIEF SUMMARY

According to one aspect, the present disclosure is directed to a method for chemically etching a surface of a part comprising positioning an etching device proximate to a part, with the part having a part surface wherein the etching device comprises a chamber, a chamber boundary, at least one chamber inlet and at least one chamber outlet. The etching device is engaged with the part surface, and a flow of an etchant solution is directed into the chamber inlet, such that the etchant solution contacts the part surface for a predetermined amount of time before exiting the chamber outlet. When the etching device chamber is in contact with a part surface, the chamber in contact with the part generates a substantially enclosed etching chamber.

In another aspect, the chamber boundary is dimensioned to surround at least a region of the part surface exposed for chemical etching.

A further aspect comprises the step of directing the flow of etchant solution from an etchant solution supply to the chamber inlet of the etching device.

Another aspect comprises the step of directing the flow of etchant solution from the chamber outlet of the etching device to an etchant solution return.

In another aspect, the etching device further comprises at least one sealing mechanism on the etching device, with the sealing mechanism contacting the part surface.

In another aspect, the chamber boundary comprises a sealing mechanism.

According to a further aspect, after the step of engaging the etching device to the part surface, a seal is generated between the etching device and the part surface.

In another aspect, a mechanical means maintains the chamber in contact with the part surface with sufficient force to maintain a substantially leak-proof seal at a chamber boundary/part surface interface.

In still another aspect, the mechanical means generates a force of from about 10 pounds to 100 pounds per linear inch of seal.

In yet another aspect, the chamber further comprises at least one vacuum port.

In yet another aspect, the chamber further comprises at least one vacuum port, with the vacuum port in communication with a vacuum source.

In another aspect, the vacuum port is located on the chamber at a point beyond the chamber boundary of the device, and the vacuum source generates a vacuum to generate a seal between the chamber and the part surface.

In a further aspect, the chamber boundary comprises at least one O-ring.

In another aspect, the chamber boundary comprises two spaced O-rings.

In yet another aspect, at least one vacuum port is positioned on the device between two spaced O-rings.

In a further aspect, the vacuum source generates a vacuum between the two spaced O-rings.

A further aspect comprises the step of establishing a flow rate of from about one gallon/hour to about one gallon/minute of etchant solution through the chamber.

In a further aspect, the rate of etching a part surface depends upon the total processing area, the strength of the etchant solution, and the depth of etching required on the part surface.

In a further aspect, the present disclosure is directed to objects comprising components made from parts that are chemically etched according to a method for chemically etching a surface of a part comprising positioning an etching device proximate to a part, with the part having a part surface, and wherein the etching device comprises an etching chamber, an etching chamber boundary, an etching chamber inlet and an etching chamber outlet. The etching device is engaged with the part surface, and a flow of an etchant solution is directed into the etching chamber inlet, such that the etchant solution contacts the part surface for a predetermined amount of time before exiting the etching chamber outlet.

In further aspects, components comprising parts made according to methods set forth in the disclosure are incorporated in objects, for example, that include, but are not limited to vehicles, such as, for example, aircraft, spacecraft, satellites, rockets, missiles, etc. and therefore include manned and unmanned aircraft, spacecraft, terrestrial, non-terrestrial, as well as surface and sub-surface water-borne vehicles, etc.

In further aspects, components comprising parts made according to methods set forth in the disclosure are incorporated in stationary objects In another aspect, the disclosure is directed to an apparatus for chemically etching a surface of a part, with the apparatus comprising an etching chamber, an etching chamber boundary, at least one etching chamber inlet and at least one etching chamber outlet, and wherein the etching chamber is configured to allow a flow of etchant solution through the etching chamber.

In another aspect, the disclosure is directed to an apparatus for chemically etching a surface of a part, with the apparatus comprising an etching chamber, an etching chamber boundary, at least one etching chamber inlet and at least one etching chamber outlet, and wherein the etching chamber inlet and the etching chamber outlet are in communication with the etching chamber.

In a further aspect, the flow of an etchant solution is configured to flow into the etching chamber inlet, such that the etchant solution contacts the part surface for a predetermined amount of time before exiting the etching chamber outlet.

In another aspect, the etching chamber outlet is in communication with an etchant solution return.

In a further aspect, the etching chamber inlet is in communication with an etchant solution supply.

In a further aspect, the etching chamber boundary further comprises a seal.

In another aspect, the apparatus further comprises a mechanical means to maintain the etching chamber in contact with the part surface with sufficient force to maintain a substantially leak-proof seal at an etching chamber boundary/part surface interface.

In another aspect, the etching chamber boundary comprises at least one O-ring.

In still another aspect, the etching chamber further comprises at least one vacuum port, with the vacuum port in communication with a vacuum source.

In another aspect, the vacuum port is located on the etching chamber at a point beyond the etching chamber boundary of the device, and the vacuum source generates a vacuum to generate a seal between the etching chamber and the part surface.

BRIEF DESCRIPTION OF THE DRAWINGS

Figure 1:
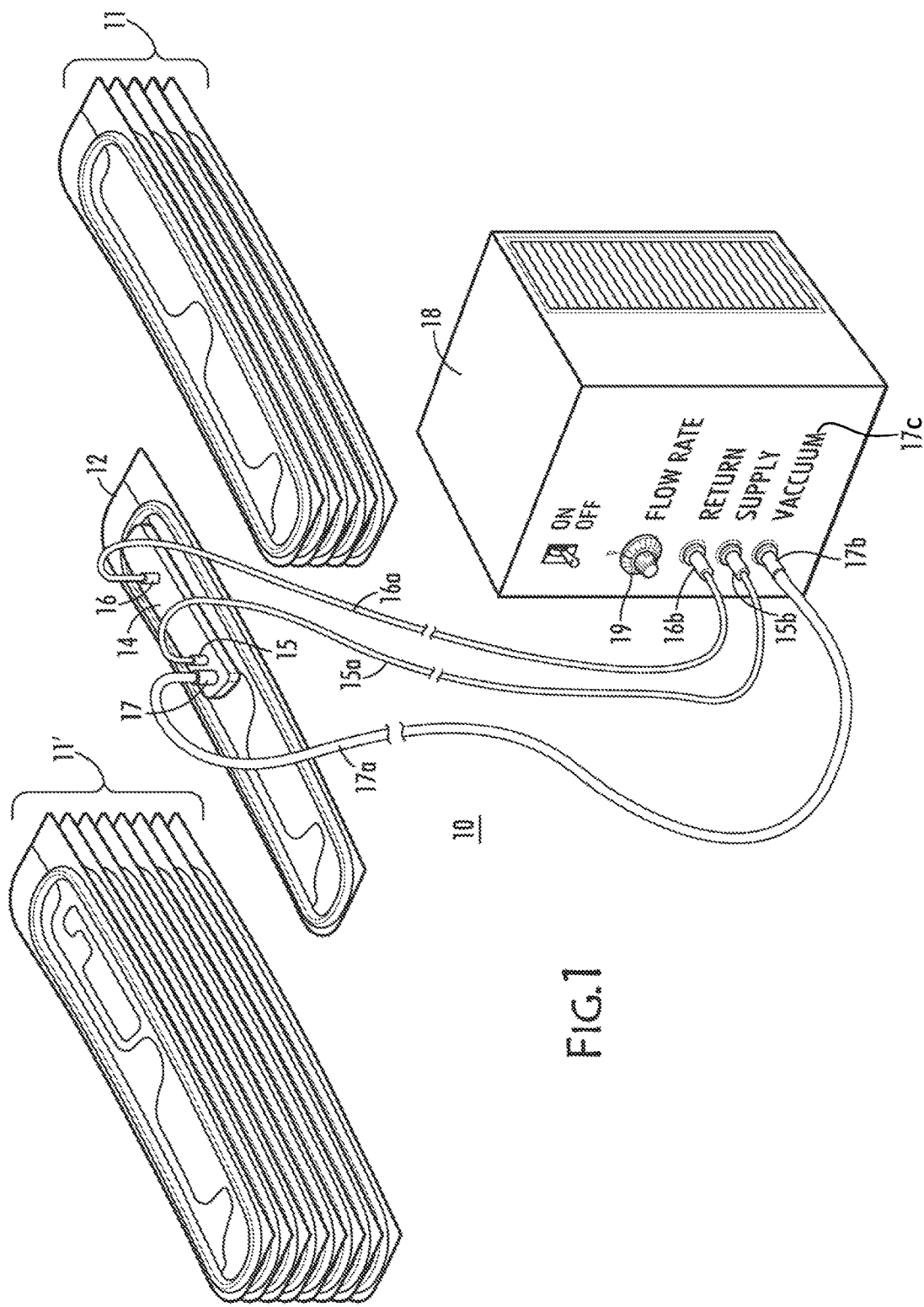
Figure 3B:
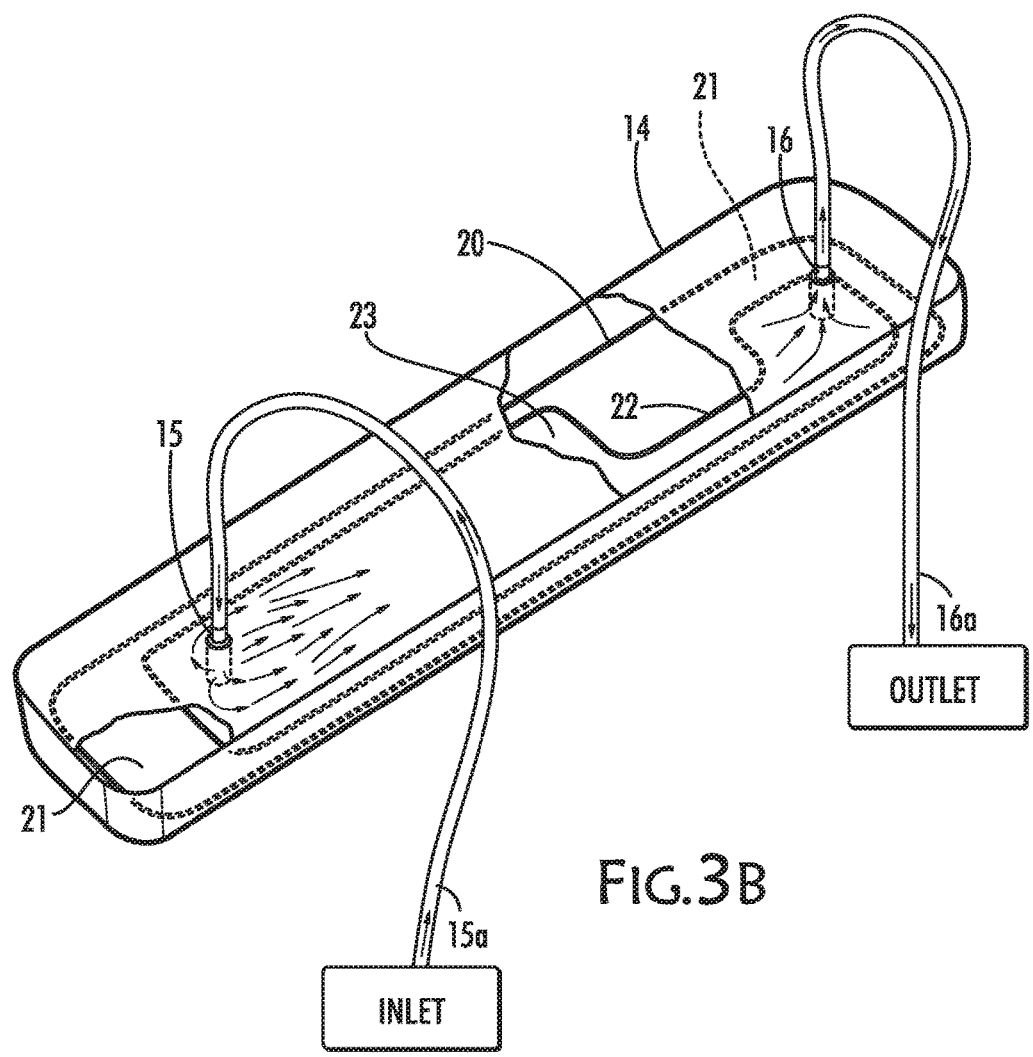

Having thus described variations of the disclosure in general terms, reference will now be made to the accompanying drawings, which are not necessarily drawn to scale, and wherein:

FIG. 1 is a perspective view of an illustrative device according to aspects of the disclosure;

FIG. 2 is an enlarged view of an etching chamber in contact with a part surface to be etched;

FIG. 3a is an enlarged view of an etching chamber of FIG. 2;

FIG. 3b is an enlarged view of an etching chamber that has no vacuum port; and

Figure 4:
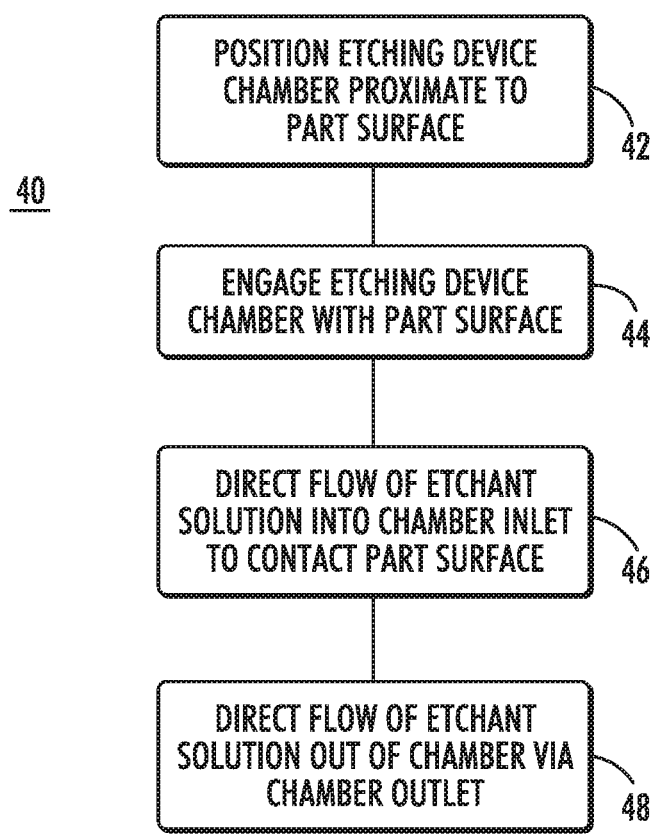
Figure 5:
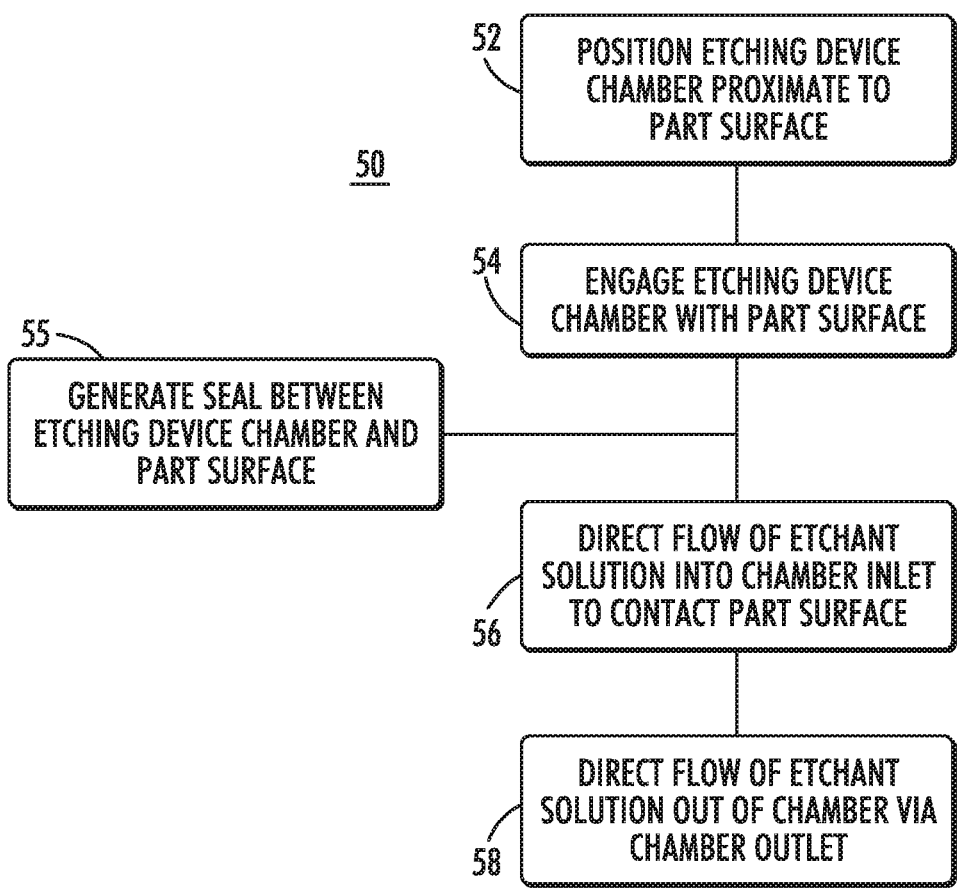

FIGS. 4-5 are flow diagrams for aspects of the present disclosure.

DETAILED DESCRIPTION

Present aspects comprise a chemical etching bath-retaining apparatus configured to hold and allow a chemical etching solution that predictably remains substantially only in contact with part surface areas to be etched, without requiring protective masking of part surfaces that are not to be etched. According to aspects, the apparatus comprises an etching device comprising an etching chamber, with a retaining or sealing feature such as, for example, at least one O-ring surrounding a perimeter around the etching chamber. According to further aspects, the etching chamber is configured to hold a predetermined amount, and/or direct a predetermined flow, of chemical etchant solution. According to still further aspects, one or more O-rings surrounding a perimeter of the etching device are configured to facilitate generating a substantially leak-proof seal with a part surface, and are therefore configured to retain a chemical etchant solution in the chamber, thereby retaining a chemical etchant solution in contact with a part surface to be etched. It is understood that when the chamber of the etching device is brought into contact with the part having a part surface to be etched, the part surface in contact with the device chamber generates and maintains a substantially enclosed chamber.

According to one aspect, an outer O-ring surrounds an outer perimeter of the etching chamber of the etching device and an inner O-ring surrounds an inner perimeter of the etching chamber of the etching device. When the etching chamber contacts a part surface, and a vacuum is applied to the etching device, the negative pressure generated in the area between the outer perimeter (e.g. the outer O-ring) and the inner perimeter (e.g. the inner O-ring) establishes a vacuum area, retaining the etching device in a desired and pre-selected position proximate to a part surface.

In another aspect, in the absence of applying a vacuum to the device, or in concert with an applied vacuum, the present disclosure further contemplates applying an external force, such as, for example, a mechanical force to the etching device to retain the device in a desired and pre-selected position proximate to a part surface. An illustrative and non-comprehensive list of mechanical means able to deliver the desired mechanical force to the etching device include, for example, toggle clamps, c-clamps, bridge clamps, H-frame or press, etc. It is further contemplated that the some or all of the listed mechanical means may be used in communication with a pneumatic cylinder. In essence, any mechanical means that provides a desired "hold-down force" that would offset the fluid transfer occurring in the contained volume (of etchant solution) in the etching chamber is contemplated. The amount of "hold down force" applied to be effective is understood to be proportional to the size of the area or region of the part surface being chemically etched, the flow pressure of the chemical etchant solution, and other factors, such as, for example the O-ring material used, surface finish and "fit-up" between the part and the etching chamber, etc. Contemplated forces required to provide and maintain the desired seal at the part surface/chamber interface, and to overcome the outward forces (generated by etchant solution flow through the chamber multiplied by the area of the area of the part surface being chemically etched), would be from about 10 to about 100 pounds per linear inch of seal (e.g. O-ring).

According to further aspects, the etching chamber comprises at least one inlet port in communication with an etchant solution supply line connected to an etchant solution supply, and at least one outlet port in communication with an outlet line connected to an etchant solution return. The etching chamber further comprises at least one vacuum port in communication with a vacuum that is able to deliver negative pressure to the area between an inner O-ring and an outer O-ring to assist in securing the etching chamber in a predetermined location proximate to a part surface to be etched. The inlet and outlet ports are located on the chamber to maximize an efficient and predetermined flow of etchant solution through the etching chamber and over the part surface to be etched. It is understood that parts to be etched may have complex shapes, and the parts to be etched comprise regions on their surfaces to be etched, and that such regions may also be complex in shape. It is further understood that the etching chamber may comprise more than one inlet port, more than one outlet port, and more than one vacuum port as desired.

FIG. 1 shows an apparatus 10 for etching parts according to aspects of the present disclosure. A supply of parts to be etched (unetched parts) 11 is shown. A stack of etched parts 11' is also shown. Part 12 is engaged with an apparatus comprising an etching chamber 14, having inlet port 15 connected to inlet line 15a, outlet port 16 connected to outlet line 16a and vacuum port 17 connected to vacuum line 17a. Inlet line 15a is shown connected to a chemical etchant solution supply port 15b of a controller 18. Outlet line 16a is shown connected to a chemical etchant solution return port 16b of a controller 18. Vacuum line 17a is shown connected to vacuum port 17b of controller 18, with vacuum port 17b in communication with vacuum source 17c. Controller 18 comprises a flow rate control 19 able to selectively alter the rate at which, and otherwise tailor the manner in which, an etchant solution is dispensed from an etchant solution supply to the etching chamber 14. Although not shown, controller 18 may comprise a vacuum control to tailor and otherwise control the negative pressure applied by a vacuum to the etching chamber 14.

FIG. 2 is an enlarged view of a portion of the etching chamber 14 in place on a part 12 to be etched. Outer O-ring 20 and inner O-ring 22 are shown generating an area 21 between the outer O-ring 20 and inner O-ring 22 that extends circumferentially about chamber 14. Vacuum port 17 is located within area 21 such that, when a vacuum source 17c (negative pressure) is applied to vacuum line 17a, air is removed from area 21 generating a seal at the interface of the O-rings 20 and 22 and the part 12. As shown in FIGS. 1 and 2, once the vacuum is generated and the chamber 14 is sealed onto part 12, a flow of chemical etchant solution is dispensed from a chemical etchant solution supply port 15b of controller 18, through inlet line 15a and into chamber 14 via inlet port 15. Arrows show a direction of chemical etchant solution flow within chamber 14 from the general area of the inlet port 15, across a surface area 23 of a part 12 to be etched, and toward outlet port 16 (and out of chamber 14). The chemical etchant solution then returns via outlet line 16a to a chemical etchant solution return port 16b on controller 18.

In another aspect, FIG. 3a shows the etching chamber of FIGS. 1 and 2 alone (i.e. without the presence of a part having a part surface to be etched). Etching chamber 14, is shown having inlet port 15 connected to inlet line 15a, outlet port 16 connected to outlet line 16a and vacuum port 17 connected to vacuum line 17a. Though not shown, inlet line 15a is connected to a chemical etchant solution supply. Though not shown, outlet line 16a is connected to a chemical etchant solution return. line 17a is connected to a vacuum source 17c. Although not shown, a controller may comprise a vacuum control to tailor and otherwise control the negative pressure applied by a vacuum to the etching chamber.

In another aspect, FIG. 3b shows a variation of the etching chamber of FIGS. 1-3, without the presence of a vacuum port. It is understood that this etching chamber would be used in conjunction with a mechanical means (not shown) to configure, position and retain the etching chamber proximate to a part surface, wherein a region of the part surface is to be chemically etched.

According to a further aspect, it is understood that a substantially continuous etchant solution flow is delivered to the etching chamber inlet (for example, from an etchant solution supply), and the etchant solution flow contacts the surface of the part to be etched before the flow of etchant solution leaves the chamber via the etching chamber outlet (flowing, for example to an etchant solution return.) In this case, the etchant solution is understood to be recirculated, but, if desired, the etchant solution may be filtered, and if necessary, replenished and reused. According to further aspects, it is understood that the etchant solution, upon leaving the etching chamber, may be directed to material waste storage for eventual disposal. The flow rate of the etchant solution through the etching chamber flows at any predetermined rate that will accomplish the desired etching of the part surface being etched. A further aspect comprises the step of establishing a flow rate of from about one gallon/hour to about one gallon/minute of etchant solution through the etching chamber, depending upon, for example, the total processing area on the part surface, the concentration or "strength" of the etchant solution, the depth of etching required on the part surface, etc.

According to a further aspect, it is understood that a substantially discontinuous etchant solution flow is delivered to the etching chamber via the etching chamber inlet (for example, from an etchant solution supply) and contacts the surface of the part to be etched, with a predetermined dwell period comprising the time it takes the etchant solution to at least partially fill the etching chamber, with the solution remaining in contact with the part to be etched for a predetermined time, before the flow of etchant solution is removed from the etching chamber (directed, for example, from the etching chamber via the etching chamber outlet to an etchant solution return). In this case, the etchant solution is understood to be recirculated, but, if desired, the etchant solution may be filtered, and if necessary, replenished and reused. Further, according to further aspects, it is understood that the etchant solution, upon leaving the etching chamber, may be directed to material waste storage for eventual disposal. As set forth above, the flow rate of the etchant solution through the etching chamber flows to at least partially fill the chamber at any predetermined rate that will accomplish the desired etching of the part surface being etched. A further aspect comprises the step of establishing a flow rate into the etching chamber of from about one gallon/hour to about one gallon/minute of etchant solution through the chamber, depending upon, for example, the total processing area on the part surface, the concentration or "strength" of the etchant solution, the depth of etching required on the part surface, etc.

FIGS. 4 and 5 are flowcharts describing aspects of the present disclosure. FIG. 4 is a flowchart directed to one aspect showing a method for chemical etching of a part surface. According to one disclosed method 40, an etching device having a chamber is positioned proximate to a part having a part surface 42. The etching device chamber engages with the part surface 44, with a flow of etchant solution then directed into the chamber to contact the part surface 46, and the flow then being directed out of the chamber after contacting the part surface 48.

FIG. 5 shows a further method 50 for chemical etching of a part surface. According to one disclosed method, an etching device having a chamber is positioned proximate to a part having a part surface 52. The etching device chamber engages with the part surface 54, generating a seal between the etching device and the part surface 55, with a flow of etchant solution then directed into the chamber to contact the part surface 56, and the flow then being directed out of the chamber after contacting the part surface 58. It is understood that the step of the etching device engaging the part surface 54 and the step of generating a seal between the etching device and the part surface 55 may take place substantially simultaneously depending on the type of force being used to engage the etching device with the part surface. If a vacuum is used to create the seal, there may or may not be more of a delay between steps 54 and 55 as compared to mechanical force being used to engage the etching device with the part surface. It is further understood that, according to aspects of the disclosure, the seal is a substantially leak-proof seal.

EXAMPLE

According to further aspects, methods for selectively and predictably chemically etching part surfaces are contemplated wherein a part is manually, or in an automated fashion, located and verified as a part to be processed for chemical etching. An appropriately dimensioned etching chamber apparatus is matched to a selected part to be etched. The part is cleaned or otherwise prepared to remove contamination from the surface to be etched and surrounding surfaces. The chemical etching system is verified as operational and ready to process parts. Operational verification includes inspection of O-rings, insuring that the vacuum system is operating properly and set to apply a sufficient negative pressure to seal the etching chamber in place on the part, verifying that the appropriate etchant solution supply is set to be dispensed at a desired and preselected flow rate from the etchant solution supply, and any and/or all other process controls show all "systems ready". The chamber is located into position over a part to be etched. The chamber is then brought into intimate contact with the part surface such that the area to be etched is surrounded by the inner O-ring of the chamber. A vacuum is then applied (optionally along with other mechanical force applied) to insure a tight seal at the O-ring/part surface interface. Proper location of the chamber in place on the part, and the integrity of the seal created at the O-ring/part interface is verified. For example, a flow of gas (air or argon) may be applied (positive pressure) within the chamber with the gas pressure monitored for a predetermined time to insure that no leaks are present at the O-ring/part interface seal. The chemical etching process is then initiated as a desired chemical etchant solution is: 1) dispensed from a chemical etchant solution supply into the chemical etching chamber; 2) circulated at a predetermined flow rate through the chamber and in contact with the part surface to be chemically etched; and 3) directed from the etching chamber to a chemical etchant solution return, in some instances, to resupply the chemical etching supply. When the chemical etching process is completed, a neutralizing solution may be supplied to the chemical etchant solution supply line as a rinsing step, followed by removing the neutralizing/rinsing solution from the chamber, and a drying step can be commenced by supplying an inert gas or air through the chamber to dry the part that has now been etched. In other contemplated alternatives, a neutralizing solution can be provided from a neutralizing solution supply to the etching chamber via a separate neutralizing solution supply line. The vacuum and/or other mechanical forces used to maintain the chamber in place on the part surface are reversed and the etching chamber disengages from the part, (or the part is disengaged from the chamber), and the process may be repeated to chemically etch another part.

As would be understood by those skilled in the field, a desired force may be applied to ensure a seal between the surface of a part to be etched and the chemical etching or milling chamber. Such forces include a mechanical force used alone or in concert with a vacuum. As would be understood, in the case of mechanical force being applied without a vacuum, only a single seal (e.g. a seal created by a single O-ring) may be present, or multiple seals (e.g. multiple O-rings) may be used. The seals are understood to be made from any pliable material able to facilitate a substantially leak-proof seal and that is able to resist damage from exposure to typical etchant solutions.

Similarly, the etching chamber inlet line that delivers etchant solution from an etchant solution supply to the etching chamber, and the etching chamber outlet line that returns etchant solution from the etching chamber to an etchant solution return are also both understood to be constructed from a material that is able to resist damage from exposure to typical etchant solutions.

Such suitable contemplated materials for seals, lines and portions of the chamber itself that would come into contact with an etchant solution include, for example and without limitation, polytetrafluoroethylene (PTFE)—(e.g. Teflon™), poly(vinylchloride) (e.g. PVC Type I and II), polypropylene, high density polyethylene (HDPE), etc.

The term "O-ring" is used to connote any circumferential sealing feature of any shape or dimension, capable of facilitating and/or generating a seal between the etching chamber and the surface of the part to be etched. According to one aspect, the use of multiple O-rings of varying dimension, with respect to one another, simply facilitates an aspect where a vacuum is to be applied. However, if a chemical etchant solution is able to adequately traverse a part surface to be etched, and etch such a part at a negative pressure (e.g. within a vacuum environment), it is understood that configurations are also contemplated that only present a single seal about the etching chamber/part surface interface perimeter.

In addition, it is further contemplated that the chamber itself may comprise a material having requisite sealing characteristics. In this aspect, the chamber itself could provide and generate the required seal with or without the presence of additional O-rings or other sealing mechanism(s).

Still further, aspects are contemplated where a mechanical force other than, or in concert with, a vacuum may be employed to provide adequate force to press or compress the chamber against a part to be etched. In this way, adequate force other than a vacuum is contemplated to retain etchant solution in the chamber, the solution then contacting a part to be etched. When a vacuum is employed, according to aspects of the disclosure, vacuum levels would typically be measured in inches of mercury or inches of water or in terms of absolute pressure. Standard atmospheric pressure is understood as being approximately 15 pounds per square inch. If the absolute pressure under vacuum is set to about 5 pounds per square inch, then the actual delta pressure is about 10 pounds per square inch, which is easily attainable, and as would be readily understood.

According to further aspects, the chemical etchant solution would be maintained at about an absolute pressure that is set slightly higher than atmospheric pressure. An external force (either vacuum or mechanical or both) is required to maintain the chamber in desired contact with a part surface. The external force required must be greater than the force against the inner surface of the chamber (outward force) due to the pressure in the processing fluids (etchant solution). The processing fluid pressure multiplied by the surface area of the inside of the chamber generates an "outward" force that "pushes" the chamber away from the part surface.

According to one aspect, applying a vacuum or otherwise providing low pressure in the region between the two O-rings creates an "inward" force pushing the chamber against the part surface. This force is equal to the surface area of the vacuum region multiplied by the delta pressure between the external (ambient) atmosphere and the absolute pressure in the vacuum region. If the vacuum force exceeds the processing fluid pressure, then the chamber will remain in contact with the part. If not, then additional mechanical force will be required to maintain the chamber in contact with the part surface so that a substantially leak-proof seal is maintained. It is understood that more than one vacuum port may be present in the chamber.

In addition, relative to the seal created at the interface of the chamber and part to be etched, or any platform to which the part to be etched is attached, it is understood that the etchant solution will be provided to the chamber at a desired pressure to generate a desired flow of etchant solution through the chamber and across the surface of the part to be etched. According to further aspects, the rate of etchant solution flow rate and pressure may be selected to minimize leakage at the chamber/part interface, thus increasing the type of materials that can be used as a seal, or potentially to obviate the need for a separate sealing feature altogether.

As stated above, the methods and apparatuses of the present disclosure may be operated manually, or may be automated, and may be operated in concert with inspection and system control features. When the system is automated, it is understood that the methods and apparatuses may be controlled on-site or remotely, and may be computer assisted, and supported by whatever computed programs would be required to run any desired automated chemical etching system.

It is also understood that automation is not required, although automating the processes described herein is understood to increase production rates and efficiency. If a high production rate is desired, automation may be achieved by implementing robots for selecting ("picking") and lifting one or both of the part to be etched and the apparatus comprising the chamber. The particular method of picking and placing the part is not process specific. The size and shape of the parts will determine the size of the robot used and the design of robot features that will pick up and place the part and apparatus. Controlling the chemical etching process would require readily understood computer controllers. Most of the computer functions would be selected for safety reasons. According to contemplated aspects, sensors would be present to detect and signal leakage throughout the system, including at the part/chamber interface. According to aspects, the vacuum system would be fabricated with a fluid trap to collect any etchant solution that may leak past the O-ring (seals). Detecting this fluid would trigger a safety response that would likely include shutting off the chemical etchant solution supply, and potentially trigger applying a neutralizing (pH) solution. According to further aspects, the valves would be constructed from polymer materials as stated herein. Still further aspects contemplate the use of pumps, such as systolic pumps used in the medical field to keep fluid isolated. Such systolic pumps would keep the chemical etchant solution from actually entering the pump itself.

It is further understood that the methods and apparatuses disclosed herein can further be useful not only in conducting the highly targeted chemical etching of a part surface, but the apparatuses can assist in the actual part selection from a part supply, as well as part orientation. In other words, since the apparatuses of the present disclosure employ a sealing mechanism, such as, for example a vacuum or other mechanical force to generate a seal between a part surface and the apparatus, such sealing capacity can be useful in automated processes where the device can be brought into contact with, for example, a stack of parts to be chemically etched, and selectively remove each part for processing; or, if desired, chemically etch a part while located on a stack of parts, chemically etch the part, and then remove the part (after chemically etching a part surface) to a subsequent location along a process line. In such aspects, it would be understood that the apparatuses disclosed herein may require attachment to actuator arms, for example, or other devices able to move the etching chamber part of the disclosed apparatuses to desired locations.

The preferred variations and alternatives of the present disclosure relate to the manufacture and use of components of any dimension comprising parts of any dimension having etched surfaces of any dimension that would be desirable for the manufacture of larger objects, including the manufacture and use of components and parts in the fabrication of large structures. Such structures include, but are not limited to, components and parts designed to be stationary for a terrestrial or other use, or used in the manufacture of exterior or interior components of manned or unmanned vehicles and objects, such as atmospheric and aerospace vehicles and other objects, and structures designed for use in space or other upper-atmosphere environments. Contemplated objects include, but are not limited to vehicles, such as, for example, aircraft, spacecraft, satellites, rockets, missiles, etc. and therefore include manned and unmanned aircraft, spacecraft, terrestrial, non-terrestrial, and even surface and sub-surface water-borne vehicles and objects.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. An apparatus for chemically etching a part surface with an etchant solution, said apparatus comprising:
   an etching device, said etching device comprising an etching chamber;

an etching chamber boundary, said etching chamber boundary comprising an inner O-ring, said etching chamber defined by the etching chamber boundary, a part surface, and said etching device;

at least one etching chamber inlet;

at least one etching chamber outlet;

an outer O-ring extending circumferentially about the etching chamber, said outer O-ring and inner O-ring defining an area between said outer O-ring and inner O-ring;

a vacuum port located beyond the etching chamber boundary, said vacuum port located in the area between said outer O-ring and said inner O-ring;

a vacuum source, said vacuum source in communication with said vacuum port, said vacuum source configured to deliver a force to the etching chamber boundary to form a substantially leak-proof seal between the etching chamber and part surface at an area between said outer O-ring and said inner O-ring; and wherein the etching chamber is configured to deliver a flow of an etchant solution from the etching chamber inlet to the etching chamber outlet and through the etching chamber.

2. The apparatus of claim 1, wherein the flow of the etchant solution is configured to flow into the etching chamber inlet, such that the etchant solution contacts the part surface for a predetermined amount of time before exiting the etching chamber outlet.

3. The apparatus of claim 2, wherein the apparatus is in contact with the part surface.

4. The apparatus of claim 2, wherein said etching chamber boundary in contact with the part surface generates a substantially enclosed etching chamber.

5. The apparatus of claim 2, wherein the etching chamber boundary is dimensioned to surround at least a region of the part surface.

6. The apparatus of claim 1, wherein the etching chamber outlet is in communication with an etchant solution return.

7. The apparatus of claim 1, wherein the etching chamber inlet is in communication with an etchant solution supply.

8. The apparatus of claim 1, wherein the etching chamber boundary further comprises a seal.

9. The apparatus of claim 1, wherein the etching chamber boundary comprises at least one O-ring.

10. The apparatus of claim 1, wherein the etching chamber boundary comprises two spaced O-rings.

11. The apparatus of claim 1, wherein the vacuum source is configured to deliver a force to the area between said outer O-ring and said inner O-ring, said force ranging from about 10 to about 100 pounds per linear inch of seal.

* * * * *